Patented May 10, 1949

2,469,452

UNITED STATES PATENT OFFICE 2,469,452

PRODUCTION OF VISCOUS AQUEOUS ALKALINE SOLUTIONS OF VEGETABLE GLOBULINS

Walter Anderson Caldwell, West Kilbride, Scotland, assignor to Imperial Chemical Industries Limited, a corporation of Great Britain No Drawing. Application March 22, 1946, Serial No. 656,533. In Great Britain March 23, 1945

6 Claims. (Cl. 106—154)

The present invention relates to the manufacture of viscous aqueous alkaline solutions of vegetable globulins, for instance peanut globulin, such as are used for extrusion in the manufacture of filamentary products.

Solutions of suitable viscosity and physical properties for extrusion in the manufacture of filamentary products can be prepared by ageing alkaline solutions of vegetable globulins made up with suitable concentrations of the globulin and suitable concentrations of an alkali metal hydroxide. The viscosity of the freshly made solution usually rises for a considerable time at a diminishing rate and attains a maximum, after which it commences to fall. Advantage may be taken of the relatively low viscosity in initial stages to remove air bubbles from the solution by application of a vacuum, and it is usual to spin the solution when it has been aged to about its maximum viscosity for the particular concentration of the vegetable globulin and the particular alkali concentration used. For a given sample of the vegetable globulin the maximum viscosity that can be attained by ageing depends on the particular alkali metal hydroxide concentration used, but the permissible range of alkali metal hydroxide concentrations is also dependent on the concentration of the vegetable globulin.

Even when a suitable concentration of a sample of vegetable globulins and a suitable alkali metal hydroxide concentration have been selected and the ageing is carried out for the same time and at the same temperature it is very difficult to obtain even approximately reproducable viscosities in repetition operations of preparing the viscous solutions for extrusion. If in order to attain the constancy of viscosity desirable for continuous spinning operations the ageing conditions are varied in order to achieve this end, variations may result in the quality of the resulting filamentary products, since the molecular characteristics of the protein in the successive preparations of aged vegetable globulin solution may not be the same at the time they are being extruded.

Moreover, a surface gelation frequently causes wastage of the aged solutions of vegetable globulins in dilute aqueous alkali metal hydroxide solutions, and may occasion other inconveniences, for instance by interfering with the continuity of extrusion or adversely affecting the quality of the resulting filamentary product. Surface gelation occurs even in closed vessels, and is so designated since it begins at the interface where the liquid is exposed to the atmosphere and gradually spreads into the body of the solution, so that it is most severe at the interface.

In U. S. Patent No. 2,381,088 of R. H. K. Thomson there is disclosed a method for the manufacture or storage of viscous vegetable globulin solutions in dilute aqueous solutions of strong bases, which comprises maintaining in the atmosphere over the surface of the solution a partial pressure of ammonia substantially in excess of that occasioned by the incipient hydrolysis of the protein by the strong base in the solution. The surface gelation may thereby be prevented or delayed, but the method necessitates the maintainance of the solution within a closed vessel.

It is an object of the present invention to minimise the variability in the viscosity of successive preparations of aged viscous solutions of vegetable globulins in dilute aqueous solutions of metal hydroxides. Another object of the invention is to prevent or delay the surface gelation of viscous alkaline solutions of vegetable globulins in more effective or more convenient manner than has hitherto been achieved, and a further object of the invention is to provide improved viscous alkaline solutions of vegetable globulins adapted for extrusion into the form of filamentary products.

We have now found that the aforesaid objects may be achieved by including in the unmatured aqueous alkaline solution of the vegetable globulin a small percentage of an alkali metal sulphite.

According to the present invention the process for the manufacture of viscous alkaline solutions of vegetable globulins, for instance peanut globulins such as are used for extrusion in the manufacture of filamentary products comprises including in the unmatured aqueous alkaline solutions of vegetable globulins a small percentage of an alkali metal sulphite and permitting the thus treated aqueous alkaline solutions to attain the desired viscosity.

The alkali metal sulphite may be introduced as such or in the form of a bi-sulphite. Quite small amounts of alkali metal sulphite are effective, and in the case of alkaline solutions of vegetable globulins made up with sodium hydroxide, about 0.5 per cent may for instance be advantageously used, no better effects being obtained with 1 per cent, calculated as anhydrous sodium sulphite.

The sodium sulphite may advantageously be introduced into a previously formed but still unmatured solution of the vegetable globulin in the aqueous alkali employed. We have, however, observed that the character of the hitherto known alkaline solutions of vegetable globulins and especially of peanut globulins, is significantly affected by the air bubbles that are temporarily introduced while the moist vegetable globulin is being mixed with the aqueous alkaline solution used in known manner. The alkali metal sulphite used according to the present invention may accordingly if desired be present while the alkaline solution of the vegetable globulin is actually being formed.

The presence of the alkali metal sulphite does not appreciably affect the alkali metal hydroxide concentrations required to make up the solutions, but considerably reduces the viscosity of the matured solutions obtained from a given protein concentration, so that somewhat higher protein concentrations may advantageously be employed to obtain spinnable solutions. The superior keeping qualities of vegetable globulin solutions obtained in accordance with the present invention is illustrated in the following example:

*Example*

A solution is made up containing from 27 parts peanut globulin (air dry basis), 100 parts 1 per cent sodium hydroxide solution and 0.5 parts sodium sulphite (anhydrous basis). The protein is wetted with part of the water and the sodium sulphite is dissolved in the solution containing the sodium hydroxide and the remainder of the water. After maturing for 20 hours at 20° C. the solution has a viscosity of 188 poises and shows no surface gelation. The maturing is carried out in a closed vessel. The matured solution is suitable for the spinning of artificial filaments.

A portion of the freshly made unmatured solution prepared in the above manner was subjected to aeration by passing air through it. When matured in similar fashion thereafter the viscosity after 20 hours was 196 poises, and it was free from surface gelation.

By way of contrast there was also made up in similar fashion but without the sodium sulphite the solution containing 23 parts of the same sample of peanut globulin and 100 parts by weight of a 1 per cent sodium hydroxide solution. When similarly matured for 20 hours this solution had a viscosity of 170 poises and surface gelation had begun to be noticeable.

The portion of the freshly made unmatured solution prepared in this way without the use of sodium sulphite was also subjected to further aeration for a short period before maturing. In this case the viscosity after maturing the solution under the same conditions as before was 290 poises, and surface gelation was also evident.

Thus the solution prepared in accordance with the invention when matured had viscosity characteristics less dependent on the extent of the aeration occurring in the course of its preparation than a matured solution of comparable viscosity not made in accordance with the invention, and was also less liable to surface gelation.

I claim:

1. A process for the manufacture of viscous solutions that exhibit relatively low variability in viscosity between separate batches and relatively low surface gelation propensity comprising vegetable globulins dissolved in dilute aqueous solutions of alkali metal hydroxide suitable for use in the manufacture of filamentary products by extrusion from an orifice into a coagulating bath after maturation sufficient to obtain a spinnable viscosity which comprises including in an unmatured solution of vegetable globulins dissolved in an aqueous solution of alkali metal hydroxide which with time would develop surface gelation, between about 0.5 and 1% of a sulfite ion containing material from the group consisting of alkali metal sulfites and alkali metal bisulfites and permitting the resulting aqueous alkaline solution to attain a desired viscosity.

2. The process of claim 1, in which said sulfite ion containing material is sodium sulfite.

3. The process of claim 1, in which said sulfite ion containing material is sodium bisulfite.

4. The process of claim 1, in which said vegetable globulins are peanut globulins.

5. The process of claim 1, in which the sulfite ion containing material is present while the solution of the vegetable globulin is actually being formed.

6. A viscous, aqueous solution of vegetable globulin having a relatively low surface gelation propensity capable of use in the manufacture of filamentary products by extrusion comprising a solution of protein globulins dissolved in a dilute aqueous solution of an alkali metal hydroxide containing about 0.5 to 1% of a sulfite ion containing material from the group consisting of alkali metal sulfite and alkali metal bisulfites.

WALTER ANDERSON CALDWELL.

REFERENCES CITED

The following references are of record in the file of this patent:

UNITED STATES PATENTS

| Number | Name | Date |
|---|---|---|
| 2,340,909 | Traill et al. | Feb. 8, 1944 |
| 2,358,383 | Chibnall et al. | Sept. 19, 1944 |
| 2,389,605 | Atwood | Nov. 27, 1945 |